Oct. 31, 1950

E. M. GUYER 2,527,720

GLASS RESISTOR WELDING METHOD

Filed Dec. 18, 1946

Inventor
EDWIN M. GUYER
By Wright & Fowler
Attorneys

Patented Oct. 31, 1950

2,527,720

UNITED STATES PATENT OFFICE 2,527,720

GLASS RESISTOR WELDING METHOD

Edwin M. Guyer, Corning, N. Y., assignor to Corning Glass Works, Corning, N. Y., a corporation of New York Application December 18, 1946, Serial No. 716,931

1 Claim. (Cl. 201—63)

This invention relates to electric heating devices and to electric circuits for the generation of heat from electric energy.

One of the objects of the invention is to provide a heating element comprising an electrically conducting film consisting essentially of a tin compound and having a resistance from 100 ohms or less to 10,000 ohms or more per square unit of surface.

Another object is to provide a heating element comprising a transparent electrically conducting coating comprising tin oxide.

Another object is to provide an electric circuit containing such a heating element.

A further object is to provide means to promote the electrical working of glass or the heating, softening and reworking of fabricated glass by means of an electric current passed therethrough.

Another object is to provide means for heating glass with an electric current external to the glass until the glass has attained a temperature sufficient to enable it to conduct the current directly through its mass.

I have found that the above and other objects can be accomplished by forming on a non-porous or vitreous base member such as glass or other ceramic articles an electrically conducting coating comprising a tin compound by treating the base member, while heated, with a mist or vapor of tin chloride or other tin salt and introducing the coated article as a conductor into an electric circuit of suitable voltage. Such treatment process is commonly known as "iridizing" because the films are frequently iridescent in appearance. The major constituent of those films so produced is stannic oxide.

Electric circuits according to the invention are useful for a variety of purposes, depending upon the voltage to be applied and the temperature which it is desired to obtain. Among such uses is the softening or melting of glass for reworking it. It is well known that glass at room temperature is a dielectric but that its conductivity increases with temperature and when sufficiently hot it can conduct enough current to cause softening or melting of the glass, whereby various operations can be carried out, such as shaping, punching, severing and welding or sealing. By the application of substantial electric voltages to the conducting coating, according to the invention, I have found that glass articles, provided with such coating, can be heated to temperatures at which the electric current strikes into the glass and melts or softens it sufficiently for reworking. By the application of lower voltages the glass article can be employed as a heating device in a variety of ways. Such applications of the invention are shown in the accompanying drawing which is merely illustrative but does not limit the invention and in which:

Figure 1:
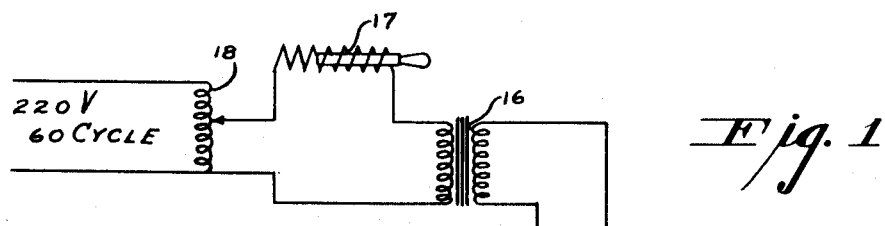
Fig. 1 illustrates diagrammatically a circuit for the electrical welding of two glass plates in accordance with the invention.
Figure 2:
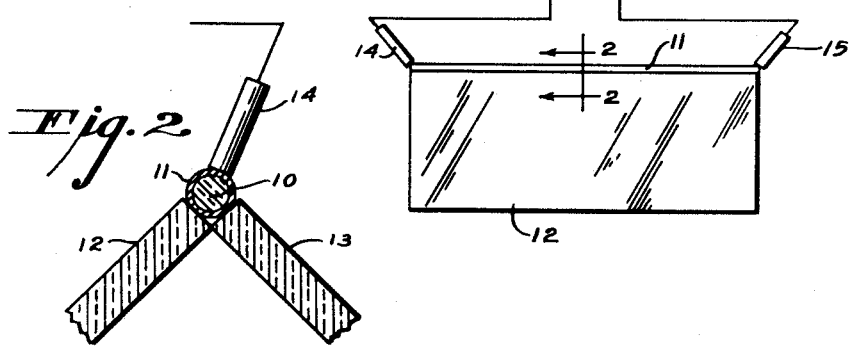
Fig. 2 is an exaggerated sectional view on the line 2—2 of Fig. 1.

Referring to Figs. 1 and 2 a glass rod 10 having an electrically conducting coating 11 comprising stannic oxide lies in the angle formed by the adjacent edges of two glass plates 12 and 13. Electrodes 14 and 15, composed of tungsten or other refractory conducting material in contact with the coating 11 at opposite ends of the rod 10, form an electric circuit through the coating 11 and a current control device comprising a transformer 16, an adjustable inductor 17 and an auto-transformer 18 which is connected with a source of 220 volt 60 cycle current (not shown).

When a voltage in the neighborhood of 1,000 volts per inch is applied through the electrodes 14 and 15, the coating 11 and the rod 10 are rapidly heated to red heat after which the rod 10 becomes of itself conducting and carries sufficient current to cause it to melt and form a weld between the glass plates 12 and 13, the auto-transformer 18 and the inductor 17 being adjusted so as to prevent sudden excessive flow of current as the glass heats up. For this purpose the coating 11 should have a relatively high resistance preferably of the order of 1,000 ohms per square or more.

Figure 4:
Fig. 4 is an enlarged view on the line 4—4 of Fig. 3 showing the conducting coating greatly exaggerated.
Figure 3:
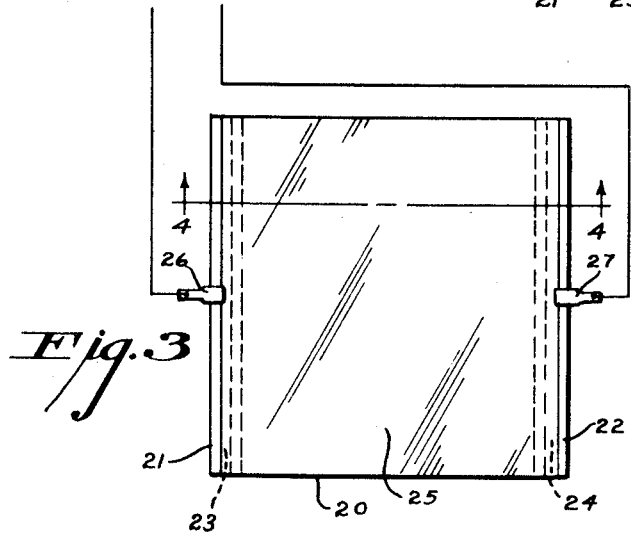
Fig. 3 is a plan view of a glass plate having thereon an electrically conducting coating according to the invention.

In Figs. 3 and 4 a glass plate 20 is provided with metallized stripes 21 and 22 of silver and superimposed metallized stripes 23 and 24 of platinum and an overlying coating 25 comprising stannnic oxide which is electrically conducting. Glass articles having such metallized stripes of silver and platinum are described and claimed in Patent No. 2,475,379 issued July 5, 1949 and assigned to the assignee of this application. The coating 25, which is in electrical contact with the metallized stripes 21, 22, 23, and 24, is connected by clamps 26 and 27 with a source of current (not shown).

The metallized stripes are formed by applying to the glass plate near its edges narrow strips of silver metallizing composition and firing it on the glass in known manner. Narrow strips of platinum metallizing composition are thereafter applied so as to contact the glass adjacent the silver strips and to overlie the silver at least in part. The platinum composition is then fired on in known manner. The silver and platinum metallizing compositions, known as "metallic lusters" or "silver or platinum bright" are well known and are readily available on the market.

The conducting coatings 11 and 25 are applied by heating the glass to 600°–700° C. and exposing it for ten to twenty seconds or more, while heated, to the fumes of stannic chloride or an atomized mist of stannous chloride solution. Other salts of tin may likewise be employed. The electrical resistance of the coating may be varied by varying the time of exposure, lower resistances in general being obtained with longer exposures.

For best results, the electrical resistance of the coating should be adjusted according to the voltage to be applied thereto. For use at relatively low temperatures such as for self-heating windows as illustrated in Fig. 3, an electrical resistance of 100 ohms or less per square unit of surface is preferable. Under these conditions, voltages of 100 volts or less may be employed.

For some purposes any ceramic body upon which the conducting coating can be deposited may be employed in lieu of glass as a support for the coating such as quartz, fused silica, glazed porcelain, or pottery and non-porous ceramic bodies in general.

I claim:

The method of generating sufficient heat to weld juxtaposed glass bodies together, which comprises passing an electric current through an electrically conducting iridized film comprising stannic oxide deposited on at least one of said bodies until the glass adjacent to said film is heated to red heat and becomes thereby itself conducing for such current, and then passing the current through the hot glass.

EDWIN M. GUYER.

REFERENCES CITED

The following references are of record in the file of this patent:

UNITED STATES PATENTS

| Number | Name | Date |
|---|---|---|
| 2,021,661 | Kisfaludy | Nov. 19, 1935 |
| 2,119,680 | Long | June 7, 1938 |
| 2,258,646 | Grisdale | Oct. 14, 1941 |
| 2,429,420 | McMaster | Oct. 21, 1947 |

FOREIGN PATENTS

| Number | Country | Date |
|---|---|---|
| 767,797 | France | July 24, 1934 |